United States Patent
Yoshida

(10) Patent No.: US 8,411,306 B2
(45) Date of Patent: Apr. 2, 2013

(54) IMAGE FORMING APPARATUS, DOCUMENT READING APPARATUS, SERVER APPARATUS, AND DATA PROCESSING SYSTEM

(75) Inventor: Hajime Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 678 days.

(21) Appl. No.: 12/627,322

(22) Filed: Nov. 30, 2009

(65) Prior Publication Data

US 2010/0149587 A1    Jun. 17, 2010

(30) Foreign Application Priority Data

Dec. 16, 2008  (JP) ................................. 2008-319905

(51) Int. Cl.
*G06F 3/12* (2006.01)
*H04N 1/40* (2006.01)
*B41J 29/38* (2006.01)

(52) U.S. Cl. ......... 358/1.15; 358/1.13; 358/448; 347/14

(58) Field of Classification Search .................. None
See application file for complete search history.

(56) References Cited

U.S. PATENT DOCUMENTS

| 5,608,493 | A * | 3/1997 | Tanaka et al. | 399/83 |
| 2004/0004733 | A1 * | 1/2004 | Barker et al. | 358/1.13 |
| 2005/0024406 | A1 * | 2/2005 | Otsuki | 347/14 |
| 2006/0056371 | A1 * | 3/2006 | Sakuda et al. | 370/338 |
| 2006/0221408 | A1 * | 10/2006 | Fukuda | 358/448 |
| 2008/0198194 | A1 * | 8/2008 | Otsuki | 347/14 |
| 2008/0252918 | A1 * | 10/2008 | Nagata | 358/1.13 |

FOREIGN PATENT DOCUMENTS

| JP | 11-196243 A | 7/1999 |
| JP | 2001-272889 A | 10/2001 |
| JP | 2002-99559 A | 4/2002 |
| JP | 2002-354212 A | 12/2002 |
| JP | 2005-210563 A | 8/2005 |
| JP | 2007-122641 A | 5/2007 |
| JP | 2008-263321 A | 10/2008 |

* cited by examiner

*Primary Examiner* — Satwant Singh
(74) *Attorney, Agent, or Firm* — Birch, Stewart, Kolasch & Birch, LLP

(57) ABSTRACT

A data processing system is provided, which improves convenience for a user in setting an operation parameter for application software to be executed by a server apparatus connected to an image forming apparatus via a network. An extracting portion of the image forming apparatus extracts a parameter entered by the user from a parameter setting sheet bearing the parameter entered therein, and transmits the extracted parameter to the server apparatus. Application software installed in the server apparatus receiving the parameter apply various kinds of information processing to document image data transmitted from the image forming apparatus, based on the parameter extracted by the extracting portion of the image forming apparatus.

13 Claims, 8 Drawing Sheets

FIG. 1
SERVER APPARATUS
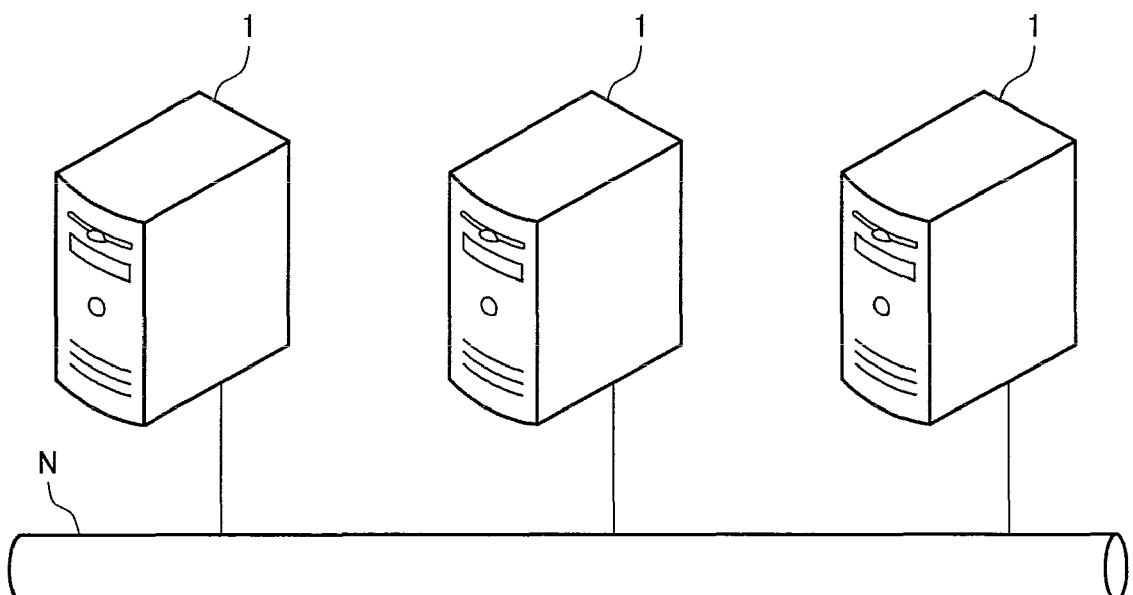
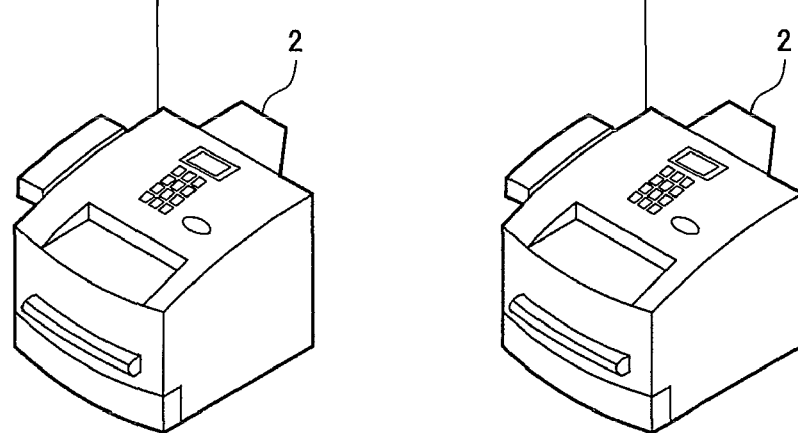
IMAGE FORMING APPARATUS

IMAGE FORMING APPARATUS, DOCUMENT READING APPARATUS, SERVER APPARATUS, AND DATA PROCESSING SYSTEM

CROSS-NOTING PARAGRAPH

This non-provisional application claims priority under 35 U.S.C. §119(a) on Patent Application No. 2008-319905 filed in JAPAN on Dec. 16, 2008, the entire contents of which are hereby incorporated herein by reference.

FIELD OF THE INVENTION

The present invention relates to a data processing system including an image forming apparatus having a scanner that scans a document to generate document image data and a server apparatus that based on a preset parameter, apply various kinds of information processing to document image data generated by the image forming apparatus based on a preset parameter.

BACKGROUND OF THE INVENTION

A data processing system (external application software linking system) has recently been proposed, in which an image forming apparatus is connected to a server apparatus having various data processing application softwares installed therein via a network and the image forming apparatus is able to cause the server apparatus to execute various kinds of data processing.

Document filing application software is an instance of the above data processing application software. According to the document filing application software, the server apparatus receives the document image data that the image forming apparatus generates by scanning a plurality of documents and stores the document image data in a folder disposed in an HDD (Hard Disc Drive) in the server apparatus.

When an operation condition, i.e., a parameter is set for application software installed in the server apparatus from the image forming apparatus, a dedicated application software for parameter setting (application software for remote control) must be ready to be used from the image forming apparatus.

A method for simplifying parameter setting operation on the image forming apparatus has been proposed. According to the method, a user enters a parameter in a sheet bearing printed spaces for entering various setting items and parameters (set value), and the sheet bearing the parameter entered therein is read by a scanner of the image forming apparatus to cause the image forming apparatus to operate based on the parameter (see Japanese Laid-Open Patent Publication No. 11-196243).

As described above, when a parameter is set for application software installed in the server apparatus from the image forming apparatus, parameter setting is carried out through parameter setting application software installed in the image forming apparatus. On parameter setting, a parameter setting screen is displayed on a display panel of the image forming apparatus.

A display area of the display panel, however, is so small that parameter setting operation is difficult. On a setting screen for setting a parameter peculiar to application software, reuse of some parameters (e.g., specified values are entered in spaces for some parameters unchanged while spaces for other parameters to be changed are left blank) cannot be set freely.

When the application software is revised into an updated version, the user has to upgrade the parameter setting application software to meet the version upgrade of the application software. Such work is troublesome.

The method disclosed in Japanese Laid-Open Patent Publication No. 11-196243 is the method of improving convenience for the user who sets an operation parameter for the image forming apparatus itself, and is not the method of setting an operation parameter for application software executed by the server apparatus connected to the image forming apparatus via a network.

SUMMARY OF THE INVENTION

The object of the present invention is to provide a data processing system that improves convenience for a user when the user sets an operation parameter for application software executed by a server apparatus connected to an image forming apparatus via a network.

Another object of the present invention is to provide an image forming apparatus in a data processing system, in which the image forming apparatus having a scanner that scans a document to generate document image data and a server apparatus that receives document image data generated by the image forming apparatus to apply various kinds of information processing to the document image data based on a preset parameter are connected to each other via a network, the image forming apparatus comprising: a printing portion that receives data for a parameter setting sheet transmitted from the server apparatus for setting a parameter to be referred to at the time of execution of an information processing by the server apparatus and prints out the data as a parameter setting sheet; and an extracting portion that extracts a parameter from document image data generated by scanning a parameter setting sheet bearing the parameter entered therein, the parameter setting sheet being printed out by the printing portion, wherein the image forming apparatus transmits the parameter extracted by the extracting portion and document image data generated by the scanner to the server apparatus.

Another object of the present invention is to provide the image forming apparatus as defined in claim 1, wherein contents of a parameter extracted by the extracting portion is displayed on a display portion of the image forming apparatus.

Another object of the present invention is to provide a document reading apparatus in a data processing system, in which the document reading apparatus having a scanner that scans a document to generate document image data, a server apparatus that receives document image data generated by the image forming apparatus to apply various kinds of information processing to the document image data based on a preset parameter, and an image forming apparatus are connected to each other via a network, the document reading apparatus comprising: an extracting portion that extracts a parameter from document image data generated by scanning a parameter setting sheet bearing the parameter entered therein, the parameter setting sheet being printed out by the image forming apparatus as a printout of data for a parameter setting sheet transmitted from the server apparatus for setting a parameter to be referred to at time of execution of an information process by the server apparatus, wherein the document reading apparatus transmits the parameter extracted by the extracting portion and document image data generated by the scanner to the server apparatus.

Another object of the present invention is to provide the document reading apparatus, wherein contents of a parameter extracted by the extracting portion is displayed on a display portion of the document reading apparatus.

Another object of the present invention is to provide a server apparatus in a data processing system, in which an image forming apparatus having a scanner that scans a document to generate document image data and the server apparatus that receives document image data generated by the image forming apparatus to apply various kinds of information processing to the document image data based on a preset parameter are connected to each other via a network, the server apparatus comprising: a data generating portion that generates data for a parameter setting sheet for setting a parameter to be referred to at the time of execution of information processing by the server apparatus; and a transmitting portion that transmits the data for a parameter setting sheet to the image forming apparatus, wherein the server apparatus receives a parameter entered in the parameter setting sheet and extracted by the image forming apparatus and document image data generated by the image forming apparatus to apply various kinds of information processing to the document image data referring to the parameter.

Another object of the present invention is to provide a server apparatus in a data processing system, in which an image forming apparatus having a scanner that scans a document to generate document image data and the server apparatus that receives document image data generated by the image forming apparatus to apply various kinds of information processing to the document image data based on a preset parameter are connected to each other via a network, the server apparatus comprising: a data generating portion that generates data for a parameter setting sheet for setting a parameter to be referred to at the time of execution of information processing by the server apparatus; a transmitting portion that transmits the data for a parameter setting sheet to the image forming apparatus; and an extracting portion that extracts a parameter from document image data generated by scanning a parameter setting sheet bearing the parameter entered therein, the parameter setting sheet being printed out by the image forming apparatus, wherein the server apparatus apply various kinds of information processing to the document image data referring to the parameter.

Another object of the present invention is to provide the server apparatus which comprises a signal receiving portion that receives a signal instructing to generate the data for a parameter setting sheet, and wherein the data generating portion starts generating the data for a parameter setting sheet when the signal receiving portion receives the signal.

Another object of the present invention is to provide the server apparatus which comprises a specifying portion that specifies an image forming apparatus serving as a destination of transmission of the data for a parameter setting sheet, and wherein the transmitting portion transmits the data for a parameter setting sheet to the specified image forming apparatus.

Another object of the present invention is to provide the server apparatus which generates the data for a parameter setting sheet based on a page description language format or a markup language format.

Another object of the present invention is to provide a data processing system comprising the image forming apparatus and any one of the server apparatus.

Another object of the present invention is to provide a data processing system comprising the document reading apparatus and any one of the server apparatus.

Another object of the present invention is to provide the data processing system, wherein data transmission/reception processing between the image forming apparatus and the server apparatus is executed using HTTP.

BRIEF DESCRIPTION OF THE DRAWINGS

FIG. 1 is a schematic diagram of a data processing system of the present invention;

PREFERRED EMBODIMENTS OF THE INVENTION

Figure 2:
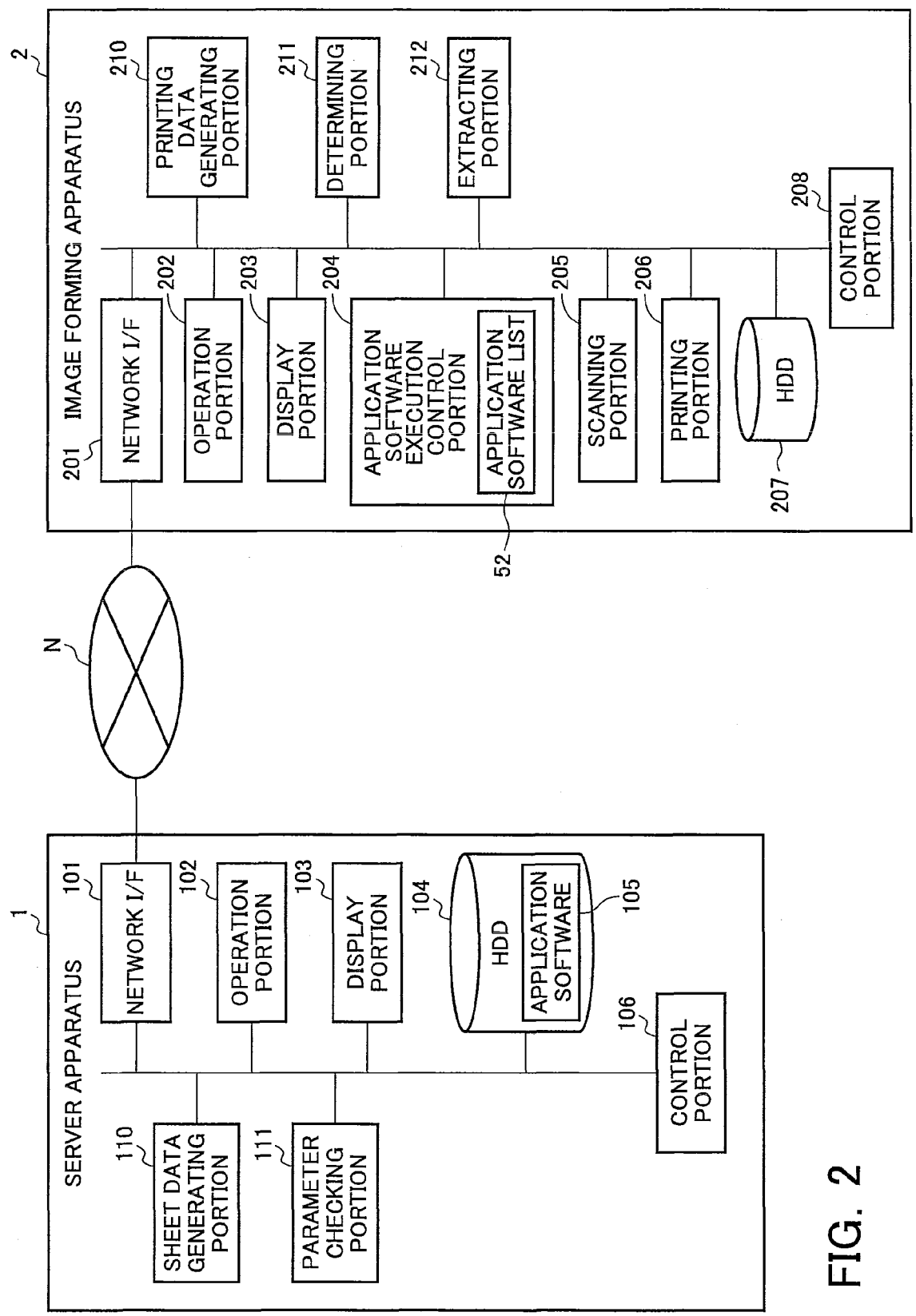
FIG. 2 is a functional block diagram of a server apparatus and an image forming apparatus that make up the data processing system of the present invention.

FIG. 1 is a schematic diagram of a data processing system of the present invention. Reference numeral 1 denotes a server apparatus that receives document image data generated by an image forming apparatus 2 such as a printer, MFP, etc., and apply various kinds of information processing to the document image data based on the preset parameters.

The image forming apparatus 2 has a scanner that scans a document to generate document image data.

The server apparatus 1 and the image forming apparatus 2 are connected to each other via a network to make up the data processing system. Data transmission/reception processing between the server apparatus 1 and the image forming apparatus 2 is carried out using, for example, HTTP.

A document fling processing will now be described as an example of various kinds of information processing.

In operating the data processing system of the present invention, a user acquires a sheet for entering parameter therein (see FIG. 3 to be described later) before executing the information processing. The user then enters (records) a place of storage of document image data (folder), a title to be set on the document image data, etc., on the sheet and puts the sheet on the top of a sheaf of documents to be filed to set the sheet and the sheaf of documents on an ADF (Automatic Document Feeder) of the image forming apparatus 2.

It is assumed in this case, for example, that the user specifies an HDD folder "new product information/July 2008" as the storage place and "XXX" as the title to be set.

Subsequently, when the user operates a scan start button of the image forming apparatus 2, the image forming apparatus 2 scans the sheet, extract the set parameters and transmits the extracted parameters to the server apparatus 1.

After that the image forming apparatus 2 scans a document set with the sheet, generates document image data and transmits the document image data to the server apparatus 1.

The server apparatus 1 which received the document image data sets "XXX" on the document image data as the title of the data and files (records) the document image data in the folder "new product information/July 2008", based on the extracted parameters.

FIG. 2 shows functional block diagram of the server apparatus 1 and the image forming apparatus 2 that make up the data processing system of the present invention.

A functional block diagram of the server apparatus 1 will be described first.

Reference numeral 101 denotes a network I/F composed of an NIC (Network Interface Card), etc., which provides an interface to connect to a network N.

Reference numeral 102 denotes an operation portion composed of a keyboard, a mouse, etc. Reference numeral 103 denotes a display portion composed of a liquid crystal display device, and the like.

Reference numeral 104 denotes an HDD that serves as a large-capacity recording device. Reference numeral 105 denotes a middleware, an application software for performing information processing executed by the server apparatus 1, which is recorded on the HDD 104. Examples of application software include the above document filing application software, business card filing application software that executes to scan a business card and then generate and record business card image data, and translation application that executes to scan a document to generate document image data, and records (prints) a document data (text data) generated by executing OCR (Optical Character Reader) processing to the document image data and a machine translation processing.

The HDD 104 records an application software such as Apache (not depicted) that offers a Web server function, the application software 105 is stored and managed in the form contained in a Web application container, such as Apache Tomcat, and the like, and is able to serve as a Web application software.

Reference numeral 106 denotes a control portion composed of a CPU, a ROM, a RAM, etc., which controls each function block. The CPU downloads the application software 105 to the RAM and controls processing to be executed.

Reference numeral 110 denotes a sheet data generating portion (data generating portion). The sheet data generating portion 110 generates the data for parameter setting sheet that is used by the user to set parameters on the server apparatus 1, the parameter being referred to at the time of execution of the information process (execution of application software) by the server apparatus 1. When the parameter setting sheet includes an item of a parameter to be referred to at the time of execution of scan processing by the image forming apparatus 2, such as a resolution used at document scanning (see FIG. 3), data related to the parameter to be referred to at the time of execution of the scan processing (data for a setting item) is generated to add the generated data to the data for the parameter setting sheet.

Figure 3:
FIG. 3 depicts an example of a parameter setting sheet.

FIG. 3 depicts an example of printed matter (sheet) of data for a parameter setting sheet. Reference numeral 51 denotes a parameter setting sheet used by the user to set parameters before the execution of the document filing application software.

Reference numeral 51*a* denotes a storage place setting space for setting a place of storage of a document (document image data), reference numeral 51*b* denotes a resolution setting space for setting a resolution used at document scanning, reference numeral 51*c* denotes a document title space for setting a document title, reference numeral 51*d* denotes a character recognition space for determining whether or not to generate document data (text data) by giving OCR (Optical Character Reader) processing to document image data, and reference numeral 51*e* denotes a QR code made by encoding an ID for identifying application software to be executed. The QR code 51*e* is disposed in a given area, such as a footer area. When the application software to be executed is the document filing application software, for example, an ID "HYKWDF" (see FIG. 5 to be described later) is encoded as the QR code.

The data for the parameter setting sheet is transmitted to the image forming apparatus 2, and printed out by the apparatus 2.

The user enters a parameter in each space (51*a* to 51*e*) of the parameter setting sheet (turning on a radio button, checking a check box, or entering a character in a text box).

The user then puts the sheet bearing the parameters entered therein on the top of a sheaf of documents to be scanned to set the sheet and the sheaf of documents on the ADF of the image forming apparatus 2.

When the scan start button of the image forming apparatus 2 is operated, the image forming apparatus 2 extracts the contents of the entered parameters and transmits the parameter contents to the server apparatus 1.

Reference numeral 111 of FIG. 2 (server apparatus 1) denotes a parameter checking portion that checks whether or not the content/value of a parameter extracted by the image forming apparatus 2 conforms to a rule predetermined for application software to be executed. For example, the parameter checking portion 111 checks whether or not a ruled out character that cannot be used as a document title (e.g., "/", "?", etc.) is included in a text entered in the document title space 51*c* for setting a document title (file title).

Functional blocks of the image forming apparatus 2 will then be described.

Reference numeral 201 denotes a network I/F that is composed of an NIC and the like, and provides an interface connected to the network N.

Reference numeral 202 denotes an operation portion composed of a numeric keypad for operating the image forming apparatus 2, the scan start button, etc.

Reference numeral 203 denotes a display portion that displays status information of the image forming apparatus 2. The display portion 203 is composed of a liquid crystal panel, and the like, on which a touch panel is disposed.

Figure 4:
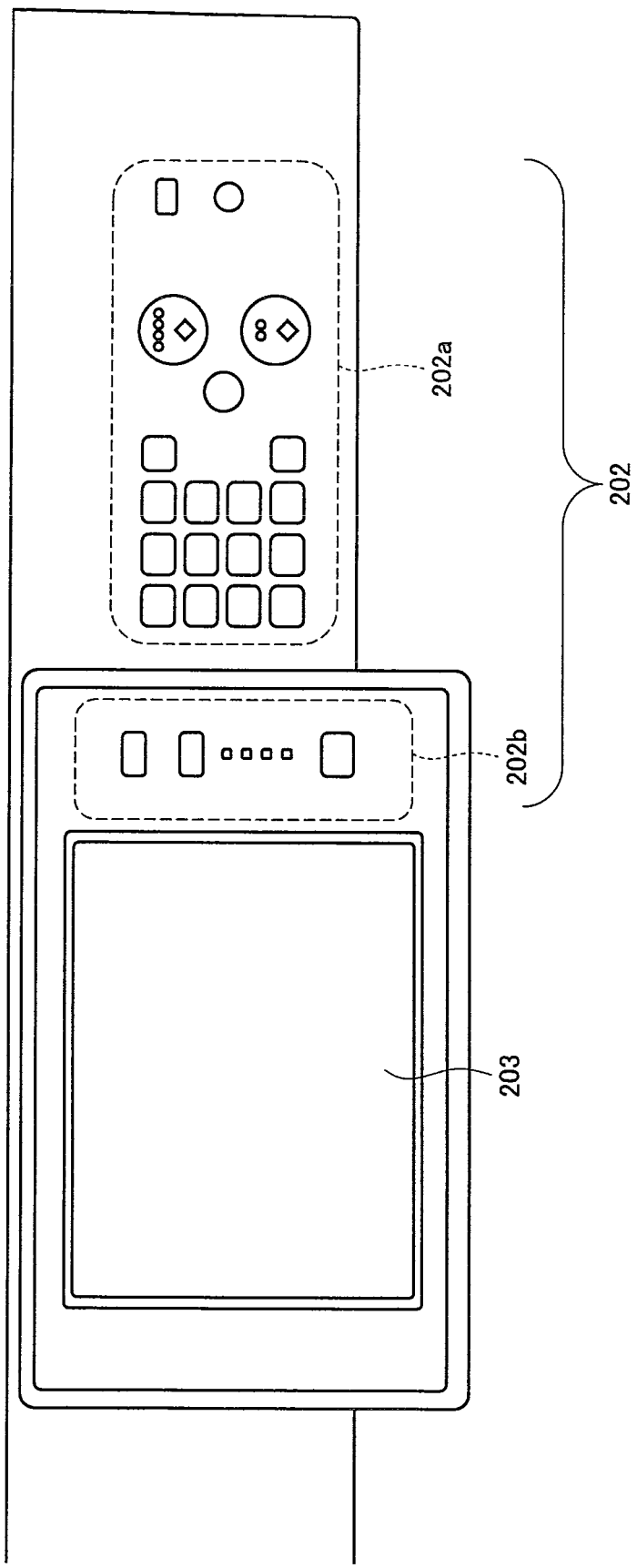
FIG. 4 is an exterior view of an operation portion and a display portion.

FIG. 4 is an exterior view of the operation portion 2 and the display portion 203. Reference numeral 202*a* denotes a basic operation portion composed of the numeric keypad, the scan start button, etc., and reference numeral 202*b* denotes a mode selecting portion composed of buttons, and the like, for switching functional modes of copy mode, scanner mode, printer mode, etc.

Reference numeral 204 of FIG. 2 denotes an application software execution control portion that controls processing for requesting the application software 105 installed in the server apparatus 1 to execute various kinds of information processing and receiving a processing result. The application software execution control portion 204 also controls data transmission/reception processing between the image forming apparatus 2 and the application software 105. Information on the application software 105 is registered in (recorded on) an application software list 52 that is recorded on the application software execution control portion 204.

Figure 5:
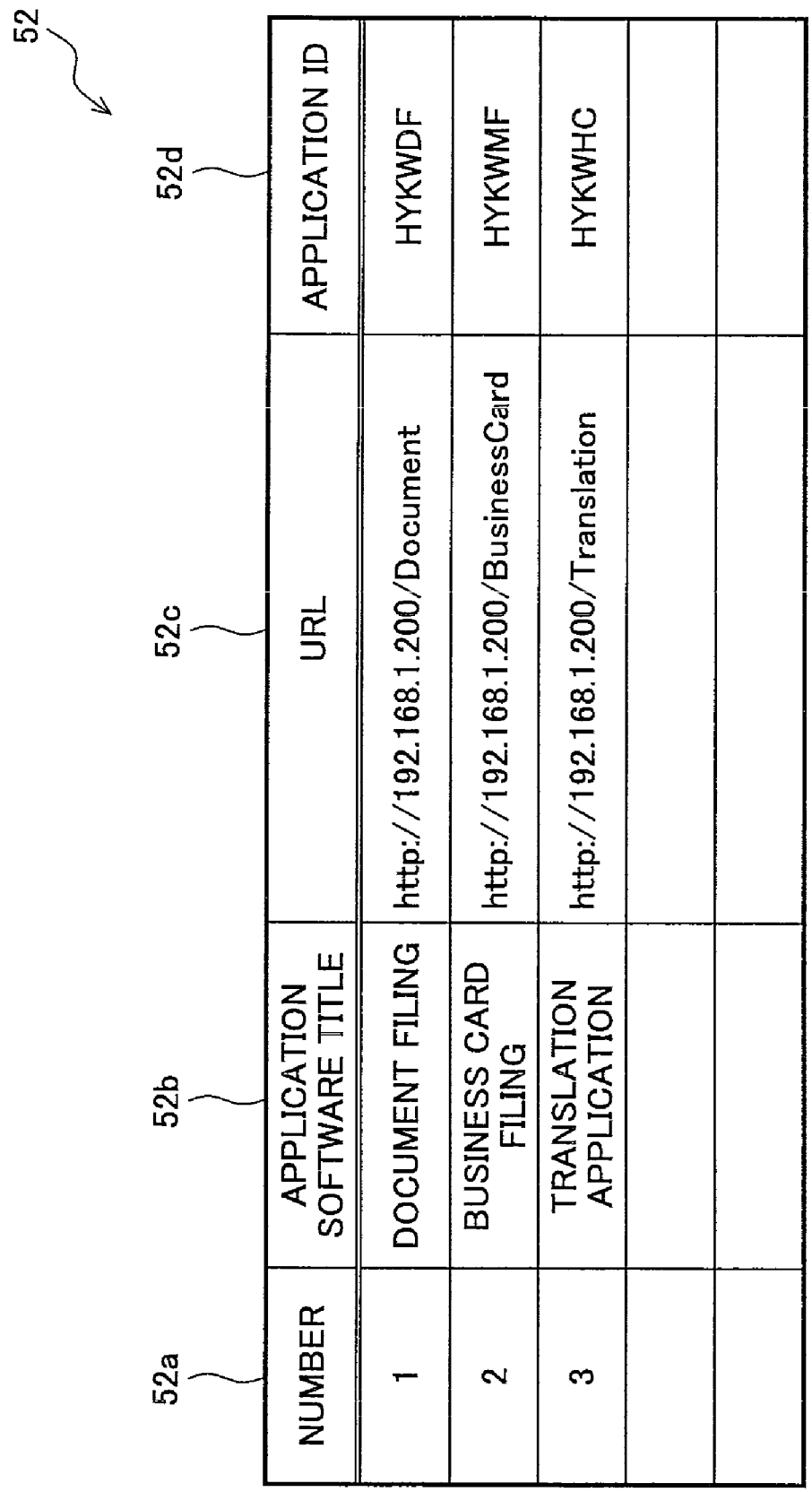
FIG. 5 depicts an example of an application software list.

FIG. 5 depicts an example of the application software list 52.

Reference numeral 52*a* denotes a number space having an entry of a number that is given in the order of registration of application software in the application software list 52.

Reference numeral 52*b* denotes an application software title space having an entry of the title of application software that is installed in the server apparatus 1 and meets a request for various kinds of information processing from the image forming apparatus 2.

Reference numeral 52*c* denotes a URL space having an entry of a URL (recording place information) for access to application software recorded in the application software title space 52b. The URL includes an access protocol (HTTP), the IP address of the server apparatus 1 in which the application software is installed (192. 168. 1. 200), and the title of the application software (Document).

While a single unit of the server apparatus is assumed in this case, a plurality of the server apparatuses may be provided. Reference numeral 52d denotes an application software ID space having an entry of an ID for identifying application software.

An administrator is allowed to set (enter) data in each of the spaces (52b to 52d) of the application software list 52 through the operation portion 202.

The application software execution control portion 204 refers to the application software list 52, controls the NIC of the network I/F 201 to establish a TCP stream socket for an IP address for application software entered in the URL space 52c of the application software list 52, and controls transmission/reception of a control command and image/text data between the application software and the image forming apparatus 2.

Reference numeral 205 denotes a scanning portion that is composed of a scanning device, the ADF, etc., and sequentially scans documents set on the ADF to generate document image data.

Reference numeral 206 denotes a printing portion (image forming portion) that prints document image data on a recording medium (paper).

The printing portion 206 also prints out received data for a parameter setting sheet as a parameter setting sheet.

Reference numeral 207 denotes the HDD that works as a large-capacity recording device. Reference numeral 208 denotes a control portion that is composed of a CPU, a ROM, a RAM, etc., and controls each function block.

Reference numeral 210 denotes a printing data generating portion (rendering portion) that generate printing data by executing various kinds of processing to data for a parameter setting sheet generated by the sheet data generating portion 110 of the server apparatus 1.

The generated printing data is output to the printing portion 206 to be printed out.

Reference numeral 211 denotes a determining portion that determines whether a document scanned by the scanning portion 205 is a parameter setting sheet. A method of determination is carried out, for example, in such a way that when the presence of the QR code (see FIG. 3) in a document (document image data) is detected, the document is determined to be the parameter setting sheet.

Reference numeral 212 denotes an extracting portion that extracts a parameter from document image data generated by scanning a parameter setting sheet bearing the parameter entered therein by the user, the parameter setting sheet being printed out by the printing portion 206. The extracted parameter is transmitted to the server apparatus 1.

The detail of the above methods of determination and of extraction will be described later.

A process for printing out a parameter setting sheet will hereinafter be described in detail.

The user operates the operation portion 202 of the image forming apparatus 2 to instruct the display portion 203 to display an application software selecting dialogue.

The control portion 208 that received the instruction refers to the application software list 52 to specify executable application software. The control portion 208 then generates dialogue bitmap data with a button displaying the title of executable application software to output the bitmap data to the display portion 203.

Figure 6:
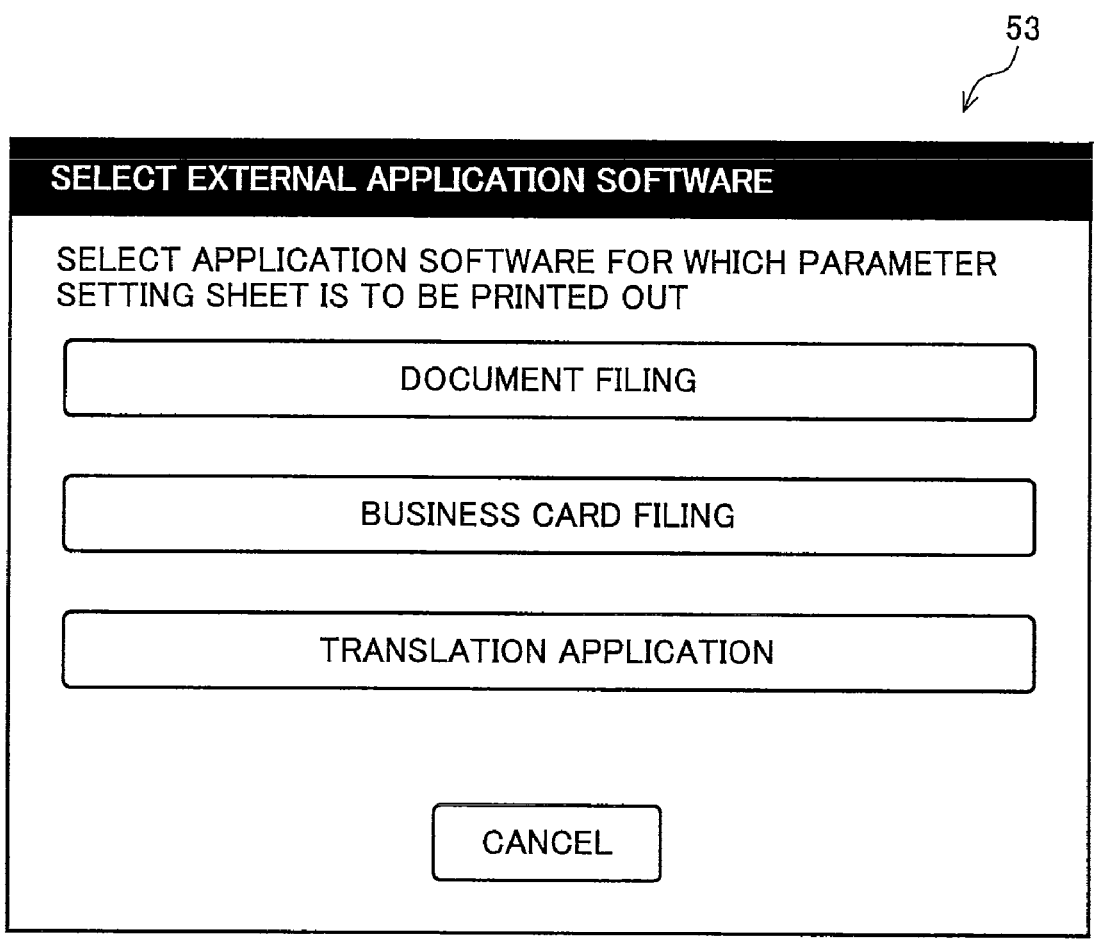
FIG. 6 depicts an example of an application software selecting dialogue.

FIG. 6 depicts an example of an application software selecting dialogue 53 displayed on the display portion 203. When the user operates a button of the dialogue 53 to select application software to be executed, the application software execution control portion 204 refers to the application software list 52 to acquire a URL for access to the selected application software. The application software execution control portion 204 then accesses the selected application software through HTTP and transmits a control signal instructing to generate a parameter setting sheet for the application software. As described above, the application software is recorded in the HDD 104 of the server apparatus 1.

The application software 105 of the server apparatus 1 that received the control signal instructs the sheet data generating portion 110 to generate data for a parameter setting sheet.

The sheet data generating portion 110 that received the instruction inquires the application software 105 about information on an item on the parameter setting sheet, e.g., about information on a place of storage of document image data (file path) to acquire the information.

When a parameter to be referred to at the time of execution of the scanning processing by the image forming apparatus 2 is present as an item on the parameter setting sheet, specification data of the image forming apparatus 2 is acquired from the image forming apparatus 2. Based on the acquired specification data, data on the parameter to be referred to at the time of execution of the scanning processing is generated, and the generated data is included in the data for the parameter setting sheet.

The sheet data generating portion 110 that acquired information on the item on the parameter setting sheet generates the data for the parameter setting sheet in such a data format as HTML and transmit the generated data to the image forming apparatus 2.

In this process, the network I/F 101 and the sheet data generating portion 110 function as a transmitting portion that transmits data for a parameter setting sheet.

The QR code 51e for identifying application software to be executed is provided as image data in the PNG format, etc. The QR code includes an encoded ID for identifying application software to be executed (see FIG. 5).

The printing data generating portion 210 of the image forming apparatus 2 that received the data for the parameter setting sheet transmitted from the server apparatus 1 converts the data for the parameter setting sheet in the HTML format into data in the bitmap format to generate printing data.

The generated printing data is output to the printing portion 206 to be printed out.

In this manner, the user acquires the parameter setting sheet.

Subsequently, the user enters parameter in a setting item space on the parameter setting sheet. In the case of the parameter setting sheet 51 of FIG. 3, the user checks a check box or enters a character in a text box.

For example, the user checks a check box for a storage place "new product information/July 2008" and a check box for a resolution at scanning "200 dpi". The user also enters a document tile "XXX" and checks a check box for post-scanning processing "recognize character".

The user then puts the parameter setting sheet bearing parameters entered therein on the top of a sheaf of documents to be filed to set the parameter setting sheet and the sheaf of documents on the ADF of the image forming apparatus 2.

Following this, when the user operates the scan start button disposed on the operation portion 202 of the image forming apparatus 2, the scanning portion 205 of the image forming apparatus 2 first scans the parameter setting sheet bearing parameters entered therein, and generates document image data of the sheet to output the generated document image data to the determining portion 211.

The determining portion 211 determines that a scanned document is the parameter setting sheet when the presence of the QR code is included in a given area of the received document data, while otherwise, it determines that the scanned document is not the parameter setting sheet. Even when the QR code is included in a given area of the received document data, if decoding the QR code leads to a conclusion that decoded data does not include any one of IDs recorded in the application software list 52 of FIG. 5, the scanned document is determined not to be the parameter setting sheet.

When the determining portion 211 determines that the scanned document is a parameter setting sheet, the scanning portion 205 outputs document image data of the scanned document to the extracting portion 212.

The extracting portion 212 applies an OCR processing and the like, to the received document image data and extracts parameters entered by the user for each setting item.

In the above case, the extracting portion 212 extracts "new product information/July 2008" as a storage place, "200 dpi" as a resolution at scanning, "XXX" as a the document tile, and "recognize character (ON)" after scanning.

Conventionally proposed various methods may be adopted as the above method of extraction.

For example, according to one of conventional methods, the coordinate value of an area in which a parameter is entered is recorded in advance, and the area is subjected to the OCR processing and various kinds of image processing to extract the parameter.

When the above parameter extraction is over, the control portion 208 may display the contents of parameters (extraction result) on the display portion 203 to allow the user to check whether the parameters are correct.

When the parameter extraction is over, the extracting portion 212 outputs an application software ID acquired by decoding the QR code to the application software execution control portion 204 together with parameters.

The application software execution control portion 204 refers to the application software list 52 to acquire a URL for access to the application software corresponding to the application software ID. The application software execution control portion 204 then accesses the application software through the HTTP and transmits the parameters.

The application software 105 of the server apparatus 1 that received the parameters outputs the parameters to the parameter checking portion 111.

The parameter checking portion 111 checks whether the parameters conform to a rule preset for the application software to be executed.

When the parameters conform to the rule, the application software 105 records the parameters temporarily in the HDD 104 or a memory (not shown), and transmits a control signal for instructing to continue document scanning to the image forming apparatus 2. When a parameter set on the image forming apparatus 2 itself, such as a resolution at document scanning, is included in the parameters, such parameter is also transmitted together with the control signal.

The control portion 106 of the image forming apparatus 2 that received the control signal that instructs the scanning portion 205 to sequentially scan documents set on the ADF, based on the control signal. At this time, the documents are scanned based on the parameter (resolution) transmitted with the control signal.

Following the above instruction, the scanning portion 205 scans the document to generate document image data, which is then transmitted to the application software 105 of the server apparatus 1 through the application software execution control portion 204.

The application software 105 of the server apparatus 1 that received the document image data executes data filing based on the temporarily recorded parameters. In the above case, the document image data is stored in a folder "new product information/July 2008" in the HDD 104 of the server apparatus 1. At this time, "XXX" is set as the title of the stored document image data. The document image data is subjected to the OCR processing to generate document data (text data), which is stored in the folder together with the document image data.

The above scanning processing is executed until the documents set on the ADF run out.

In this manner, the application software 105 of the server apparatus 1 receives parameters that are entered in a parameter setting sheet and extracted by the image forming apparatus 2 and document image data generated by the image forming apparatus 2, and applies various kinds of information processing to the document image data referring to the parameters.

When the parameter extracted by the image forming apparatus 2 are the parameter to be referred to at the time of execution of the scanning processing by the image forming apparatus 2, the image forming apparatus 2 executes the scanning processing referring to the parameter.

When the parameter checking portion 111 of the server apparatus 1 finds out that the parameters do not conform to a rule preset for application software to be executed, the parameter checking portion 111 instructs the image forming apparatus 2 to display a dialogue for notifying that the parameters do not conform to the rule.

Figure 7:
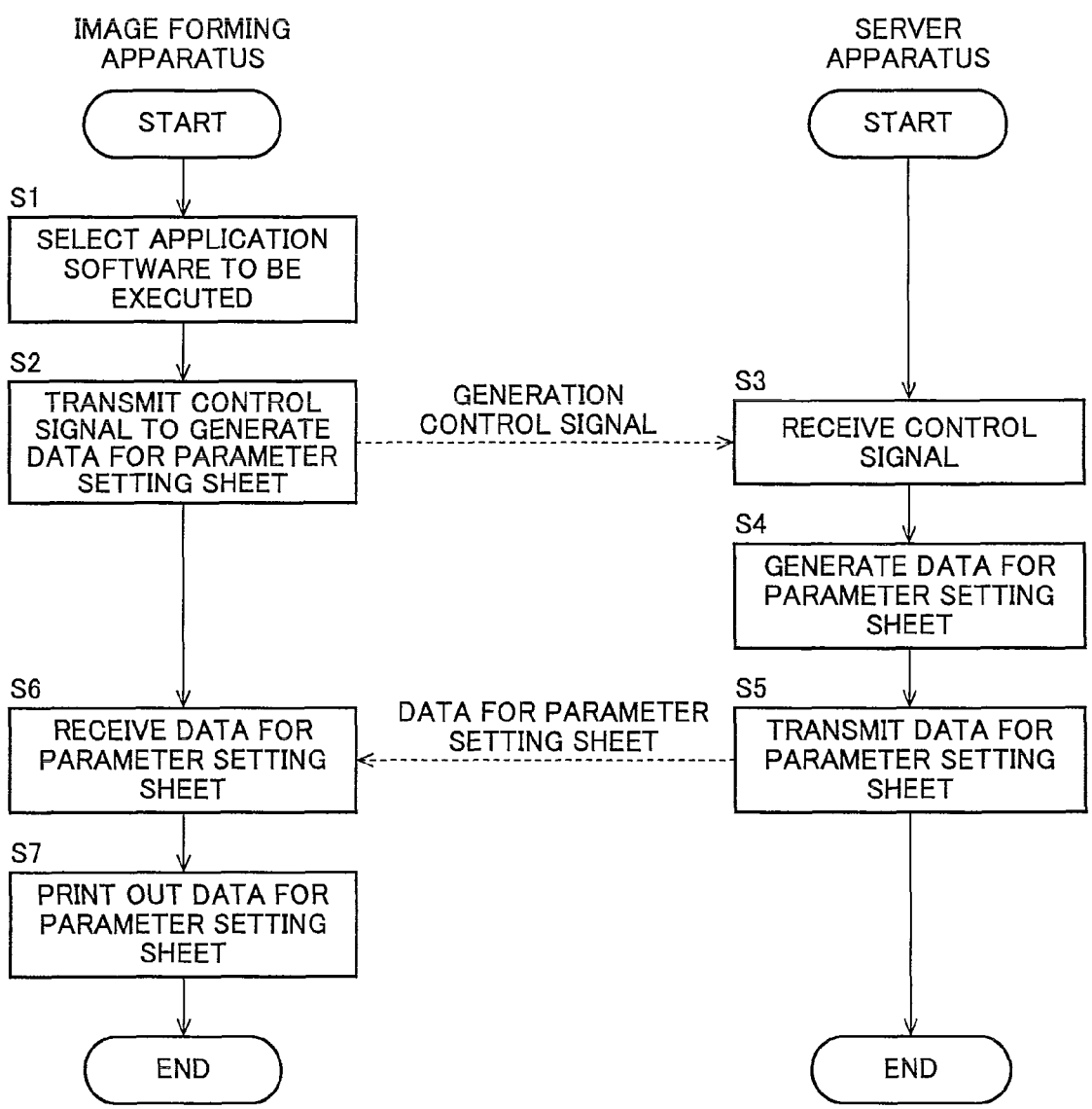
FIG. 7 is a flowchart for explaining a process for printing out a parameter setting sheet.

The process for printing out a parameter setting sheet will then be described using a flowchart of FIG. 7.

The user selects application software to be executed from the application selecting dialogue 53 displayed on the display portion 203 of the image forming apparatus 2 (step S1).

Responding to the user selection, the application software execution control portion 204 transmits a control signal to generate data for a parameter setting sheet to the application software 105 of the server apparatus 1 (step S2).

When the server apparatus 1 receives the control signal (step S3), the application software 105 in the server apparatus 1 instructs the sheet data generating portion 110 to generate the data for the parameter setting sheet. Upon receiving the instruction, the sheet data generating portion 110 generates the data for the parameter setting sheet (step S4), and transmits the generated data to the image forming apparatus 2 (step S5). When the parameter setting sheet is generated, the sheet data generating portion 110 inquires of the image forming apparatus 2 and the application software 105 about information on an item on the parameter setting sheet.

When the image forming apparatus 2 receives the data for the parameter setting sheet (step S6), the printing portion 206 prints out the data for the parameter setting sheet (printing data) (step S7).

Figure 8:
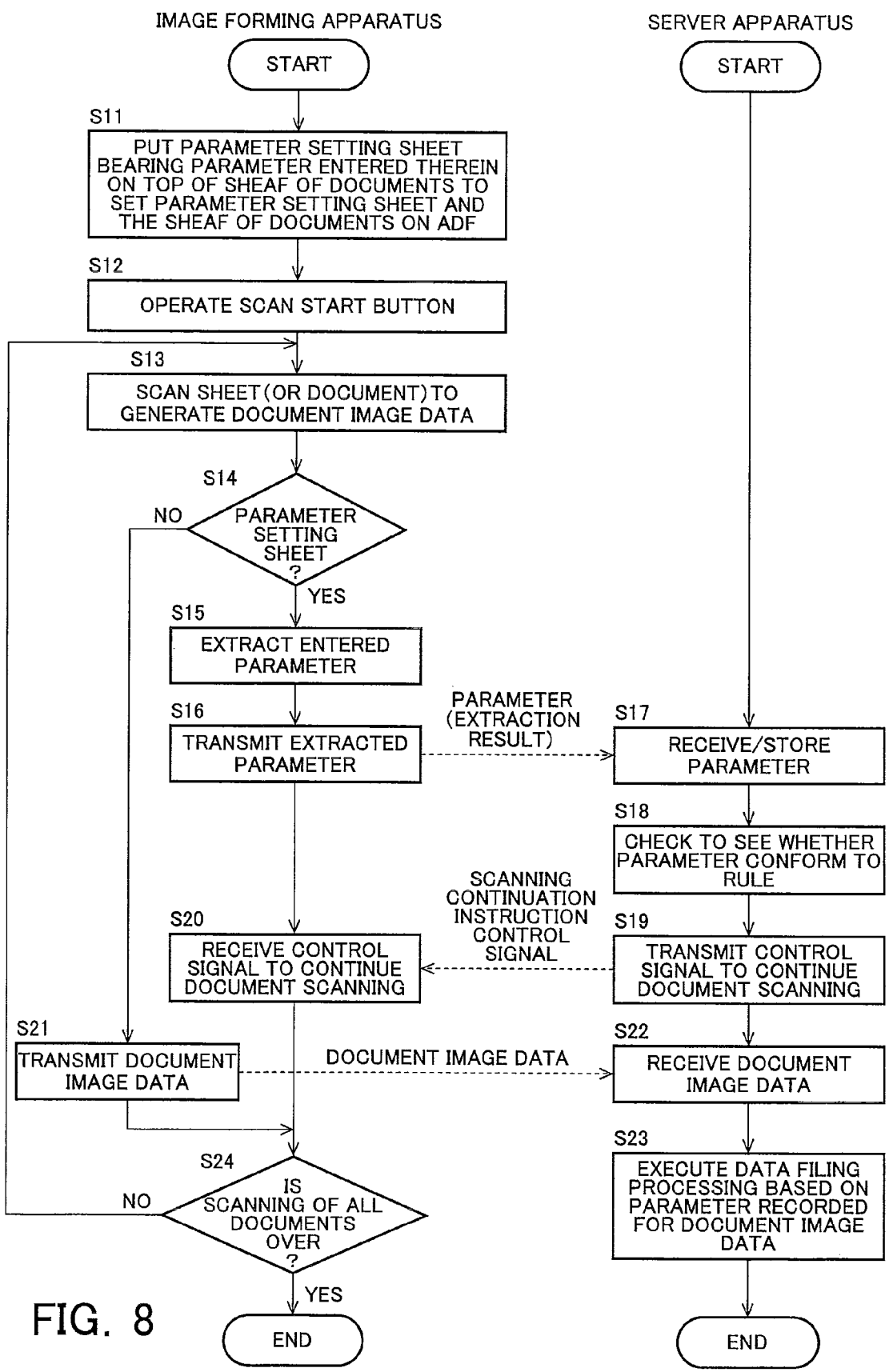
FIG. 8 is a flowchart for explaining a process that a user who acquired a parameter setting sheet enters a parameter in the sheet and then causes the server apparatus to execute application software based on the parameter.

Processing that the user who acquired a parameter setting sheet enters parameters in the sheet and then executes application software base on the parameters will be described using a flowchart of FIG. 8.

The user enters parameters in the acquired parameter setting sheet, and puts the sheet on the top of a sheaf of documents to be filed to set the parameter setting sheet and the sheaf of documents on the ADF of the image forming apparatus 2 (step S11).

When the scan start button is operated (step S12), the scanning portion 205 scans the sheet (or document) to generate document image data (step S13).

Subsequently, when the determining portion 211 determines that the scanned sheet (or document) is the parameter setting sheet (YES at step S14), the extracting portion 212 extracts the entered parameter (step S15) and output the extracted parameter to the application software execution control portion 204.

The application software execution control portion 204 receives the parameters extracted at step S15 and transmits the parameter to the server apparatus 1 (step S16).

At this time, it is preferable to display the contents of the parameter on the display portion 203 in order to allow the user to check whether the parameter is correct. In this case, when the user confirms the parameter is correct and executes check operation, such as operating an OK button, processing for transmitting the parameter to the server apparatus 1 is carried out. When the parameter is not correct, a correct parameter may be input through the operation portion 202 or the parameter setting sheet may be scanned again.

The server apparatus 1 receives the parameter (extraction result) (step S17), and the parameter checking portion 111 checks whether the parameter conforms to the rule that is preset in the application software to be executed (step S18).

Following this check, the application software 105 temporarily records the received parameter, and transmits a control signal to continue document scanning to the image forming apparatus 2 (step S19).

When the parameter does not conform to the rule, it is preferable to instruct the image forming apparatus 2 to display a dialogue for notifying that the parameter does not conform to the rule and to prompt the user to newly input a parameter conforming to the rule.

When the image forming apparatus 2 receives the control signal (step S20), the document image data generated by the scanning portion 205 (see step S13) is transmitted to the application software 105 of the server apparatus 1 through the application software execution control portion 204 after the execution of the determination processing at step S14 (step S21). Each processes at steps S13, S14, and S21 is executed on the next document that is to be processed after scanning the parameter setting sheet.

The server apparatus 1 receives the document image data (step S22), and the application software 105 executes data filing based on the temporarily recorded parameter (step S23).

Afterward, each processing at step S13 to step S23 is executed (NO at step S24) until all documents set on the ADF have been scanned (YES at step S24).

Even if the first parameter setting sheet bearing a parameter entered therein, a plurality of first documents, the second parameter setting sheet, and a plurality of second documents are stacked in order to hold a parameter setting sheet between documents, the parameter setting processing of the present invention can obviously be executed.

In this manner, the user is able to set a parameter by a simple method of entering the parameter in a parameter setting sheet. This improves convenience for the user. Copying a sheet bearing parameters entered therein enables reuse of some or all of parameters.

Even if an application software installed in the server apparatus 1 is upgraded, the image forming apparatus 2 has no need to take any measure to deal with the upgrade.

[Others]

While the extracting portion 212 is provided in the image forming apparatus 2, the extracting portion 212 may be provided in the server apparatus 1. In this case, the image forming apparatus 2 transmits document image data generated by scanning a printed parameter setting sheet bearing a parameter entered therein by the user, to the server apparatus 1. The server apparatus 1 then receives the document image data and causes the extracting portion to extract the parameter, as described above.

A PC and the like, connected to the server apparatus 1 via a network may instruct the server apparatus 1 to start generating data for a parameter setting sheet.

In this case, the server apparatus 1 is provided with a signal receiving portion that receives a signal from the PC to generate the data for the parameter setting sheet. When the signal receiving portion receives the signal, the sheet data generating portion 110 of the server apparatus 1 starts generating the data for the parameter setting sheet (see steps S3 and S4 of FIG. 7).

It is possible to specify image forming apparatus which is the destination of the generated data for a parameter setting sheet.

In this case, the server apparatus 1 is provided with a specifying portion that specifies an image forming apparatus which is the destination of transmission of the data for the parameter setting sheet. The server apparatus 1 thus transmits the data for the parameter setting sheet to the specified image forming apparatus (see step S5 of FIG. 7).

Specifying the image forming apparatus may be carried out in such a way that image forming apparatuses preregistered in the server apparatus 1 are listed to allow the server apparatus 1 to select the image forming apparatus out of the listed image forming apparatuses.

In this manner, a PC and the like is able to instruct the server apparatus 1 to generate data for a parameter setting sheet and select an image forming apparatus that prints out data for a parameter setting sheet. This improves convenience for the system user.

The image forming apparatus 2 may be configured as a document reading apparatus by recovering the printing portion 206 and the printing data generating portion 210 from the apparatus 2. In this case, an image forming apparatus having the printing portion 206 and the printing data generating portion 210 must be connected to the network N.

Functions executed by the server apparatus 1 may be achieved by a physical PC or may be exerted on a virtual PC.

It is assumed that the network N is provided as a physical LAN, typically as an Ethernet (registered trademark). The network N, however, may be configured as a virtual private network (VPN) made up of software or may be connected to the Internet.

In addition to a parameter setting sheet for document filing application software, a parameter setting sheet for business card filing application software and that for translation application software may also be generated.

A parameter setting sheet for business card filing application software includes "space for file title/storage place of business card data subjected to character reading", "space for selecting registration or no registration of phone number read from business card as phone book data for MFP", and "space for selecting registration or no registration of read e-mail address as address book data for MFP", in addition to the above "storage place setting space", "resolution setting space", "document title space", and "character reading space".

A parameter setting sheet for translation application includes "space for specifying source language, destination language" and "space for selecting translation dictionary covering technical terms in fields of electronics, law, and medicine", in addition to the "storage place setting space" and "resolution setting space".

Data for a parameter setting sheet generated by the sheet data generating portion 110 of the server apparatus 1 may be generated as bitmap format data. This allows omission of the printing data generating processing executed by the printing data generating portion 210 of the image forming apparatus 2. If the coordinate value of an entry space in the sheet is stored together with an application software ID in the image forming apparatus 2, the parameter extracting processing can be simplified.

Data for a parameter setting sheet may be generated using a page description language, such as Post Script, or a markup language, such as SGML (Standard Generalized Markup Language), XHTML (Extensible Hypertext Markup Language), and XML (Extensible Markup Language).

In this case, if style data (data that defines a display format of character color and the like) is registered in advance in the image forming apparatus 2, a setting sheet satisfying the taste of a user can be generated by applying a style defined by the style data to the setting sheet.

If a style sheet conforming to CSS (Cascading Style Sheets) is also registered in image forming apparatus 2, the appearance of the parameter setting sheet can be customized. Generating data for a parameter setting sheet using) XML allows more flexible style conversion using a style sheet conforming to XSL (Extensible Style Sheet Language).

The QR code 51e of the parameter setting sheet 51 may be replaced with a bar code. An ID for identifying application software may be recorded as a text format ID on the data for the parameter setting sheet, instead of being encoded into the QR code. In this case, the image forming apparatus 2 may encode the ID into the QR code.

When a plurality of parameter setting sheets are generated, the QR code may include a code indicative of a series of sheets and a code indicative of the first/last parameter setting sheets.

The control processing (control processing for services by another apparatus) for data transmission/reception executed between the server apparatus 1 and the image forming apparatus 2 may be carried out using HTTP.

Besides HTTP, HTTPS may also be used to carry out encrypted communication. A method of indicating a place of recoding application software has not always to be a URL-based method.

The present invention offers the following effect.

The present invention reduces work of setting an operation parameter for application software to be executed by a server apparatus connected to an image forming apparatus via a network, thus improves convenience for a user.

The invention claimed is:

1. An image forming apparatus in a data processing system, the data processing system comprising the image forming apparatus having a scanner that scans a document to generate document image data and a server apparatus that receives document image data generated by the image forming apparatus to apply various kinds of information processing to the document image data based on a preset parameter, the image forming apparatus and server apparatus being connectable to each other via a network, the image forming apparatus comprising:

a printing portion that receives data for a parameter setting sheet transmitted from the server apparatus for setting a processing parameter to be referred to at the time of execution of an information processing by the server apparatus and prints out the data as a parameter setting sheet; and an extracting portion that extracts the processing parameter from document image data generated responsive to scanning a parameter setting sheet bearing the preset parameter entered therein, the parameter setting sheet being printed out by the printing portion, wherein the image forming apparatus transmits the processing parameter extracted by the extracting portion and document image data generated by the scanner to the server apparatus.

2. The image forming apparatus as defined in claim 1, wherein contents of the processing a parameter extracted by the extracting portion is displayed on a display portion of the image forming apparatus.

3. A document reading apparatus in a data processing system, in which the document reading apparatus having a scanner that scans a document to generate document image data, a server apparatus that receives document image data generated by an image forming apparatus to apply various kinds of information processing to the document image data based on a preset parameter, the document reading apparatus, the server apparatus, and the image forming apparatus being connectable to each other via a network, the document reading apparatus comprising:

an extracting portion that extracts a processing parameter from document image data generated by scanning a parameter setting sheet bearing the preset parameter entered therein, the parameter setting sheet being printed out by the image forming apparatus as a printout of data for a parameter setting sheet transmitted from the server apparatus for setting the processing parameter to be referred to at the time of execution of an information processing by the server apparatus, wherein the document reading apparatus transmits the processing parameter extracted by the extracting portion and document image data generated by the scanner to the server apparatus.

4. The document reading apparatus as defined in claim 3, wherein contents of the processing parameter extracted by the extracting portion is displayed on a display portion of the document reading apparatus.

5. A server apparatus in a data processing system, the data processing system comprising an image forming apparatus having a scanner that scans a document to generate document image data and the server apparatus that receives document image data generated by the image forming apparatus to apply various kinds of information processing to the document image data based on a preset parameter, the server apparatus and the image forming apparatus being connectable to each other via a network, the server apparatus comprising:

a data generating portion that generates data for a parameter setting sheet for setting a processing parameter to be referred to at the time of execution of information processing by the server apparatus; and a transmitting portion that transmits the data for a parameter setting sheet to the image forming apparatus, wherein the server apparatus receives the processing parameter corresponding to the preset parameter entered in the parameter setting sheet and extracted by the image forming apparatus and document image data generated by the image forming apparatus to apply various kinds of information processing to the document image data responsive to the processing parameter.

6. A server apparatus in a data processing system, in which an image forming apparatus having a scanner that scans a document to generate document image data and the server apparatus that receives document image data generated by the image forming apparatus to apply various kinds of information processing to the document image data based on a preset parameter, the server apparatus and the image forming apparatus being connectable to each other via a network, the server apparatus comprising:

a data generating portion that generates data for a parameter setting sheet for setting a processing parameter to be referred to at the time of execution of an information processing by the server apparatus;

a transmitting portion that transmits the data for the parameter setting sheet to the image forming apparatus; and an extracting portion that extracts the processing parameter from document image data generated by scanning the parameter setting sheet bearing the preset parameter entered therein, the parameter setting sheet being printed out by the image forming apparatus, wherein the server apparatus applies various kinds of information processing to the document image data corresponding to the document, responsive to the processing parameter.

7. The server apparatus as defined in claim 5 or 6, which comprises a signal receiving portion that receives a signal instructing to generate the data for a parameter setting sheet, and wherein the data generating portion starts generating the data for a parameter setting sheet when the signal receiving portion receives the signal.

8. The server apparatus as defined in claim 5 or 6, which comprises a specifying portion that specifies an image forming apparatus serving as a destination of transmission of the data for a parameter setting sheet, and wherein the transmitting portion transmits the data for a parameter setting sheet to the specified image forming apparatus.

9. The server apparatus as defined in claim 5 or 6, which generates the data for a parameter setting sheet based on a page description language format or a markup language format.

10. A data processing system comprising an image forming apparatus having a scanner that scans a document to generate document image data and a server apparatus as defined in claim 5 or 6, the image forming apparatus and server apparatus being connectable to each other via a network, the image forming apparatus comprising:

a printing portion that receives data for a parameter setting sheet transmitted from the server apparatus for setting a processing parameter to be referred to at the time of execution of an information processing by the server apparatus and prints out the data as a parameter setting sheet; and an extracting portion that extracts the processing parameter from document image data generated responsive to scanning a parameter setting sheet bearing the preset parameter entered therein, the parameter setting sheet being printed out by the printing portion, wherein the image forming apparatus transmits the processing parameter extracted by the extracting portion and document image data generated by the scanner to the server apparatus.

11. A data processing system comprising a document reading apparatus having a scanner that scans a document to generate document image data, a server apparatus as defined in claim 5 or 6, and an image forming apparatus, the document reading apparatus, the server apparatus, and the image forming apparatus being connectable to each other via a network, the document reading apparatus comprising:

an extracting portion that extracts a processing parameter from document image data generated by scanning a parameter setting sheet bearing the preset parameter entered therein, the parameter setting sheet being printed out by the image forming apparatus as a printout of data for a parameter setting sheet transmitted from the server apparatus for setting the processing parameter to be referred to at the time of execution of an information processing by the server apparatus, wherein the document reading apparatus transmits the processing parameter extracted by the extracting portion and document image data generated by the scanner to the server apparatus.

12. The data processing system as defined in claim 10, wherein data transmission/reception processing between the image forming apparatus and the server apparatus is executed using HTTP.

13. The data processing system as defined in claim 11, wherein data transmission/reception processing between the image forming apparatus and the server apparatus is executed using HTTP.

* * * * *